United States Patent [19]

Lee

[11] Patent Number: 5,715,015
[45] Date of Patent: Feb. 3, 1998

[54] METHOD OF ENHANCING DETAILS CONTAINED IN A COLOR SIGNAL AND A CIRCUIT FOR IMPLEMENTING THE SAME IN A COLOR VIDEO APPARATUS

[75] Inventor: Hyo-seoung Lee, Seoul, Rep. of Korea

[73] Assignee: Samsung Electronics Co., Ltd., Kyungki-Do, Rep. of Korea

[21] Appl. No.: 704,807

[22] Filed: Aug. 28, 1996

[30] Foreign Application Priority Data

Aug. 29, 1995 [KR] Rep. of Korea .............. 95-27284

[51] Int. Cl.⁶ ...................................... H04N 5/208
[52] U.S. Cl. ................ 348/629; 348/627; 348/630
[58] Field of Search ..................... 348/606, 627, 348/629, 630, 675, 26, 623; 382/266; 345/185, 199; H04N 5/208, 5/21

[56] References Cited

U.S. PATENT DOCUMENTS

| | | | |
|---|---|---|---|
| 4,962,419 | 10/1990 | Hibbard et al. | 348/675 |
| 4,972,256 | 11/1990 | Hirosawa et al. | 348/630 |
| 5,077,603 | 12/1991 | Macovski | 358/37 |
| 5,469,145 | 11/1995 | Limberg | 348/629 |
| 5,557,334 | 9/1996 | Dadourian | 348/606 |
| 5,606,375 | 2/1997 | Lee | 348/606 |

FOREIGN PATENT DOCUMENTS

WO 90/09722  8/1990  WIPO .............. H04N 9/64

Primary Examiner—Glenton B. Burgess
Assistant Examiner—Jeffrey S. Murrell
Attorney, Agent, or Firm—Sughrue, Mion, Zinn, Macpeak & Seas, PLLC

[57] ABSTRACT

A method and circuit for reducing distortion of low level signals by efficiently separating noise and signal components using correlativity between respective red (R), green (G) and blue (B) channels and the amplitudes of the detail components. The detail enhancement method includes extracting detail components, determining signal/noise, cancelling noise or enhancing details and outputting a detail-enhanced image signal. Even if a high-pass frequency component of the input signal is smaller than a critical value, the input signal is accurately separated as a signal component or a noise component. The signal is cancelled only when the input signal is classified as a noise component.

12 Claims, 15 Drawing Sheets

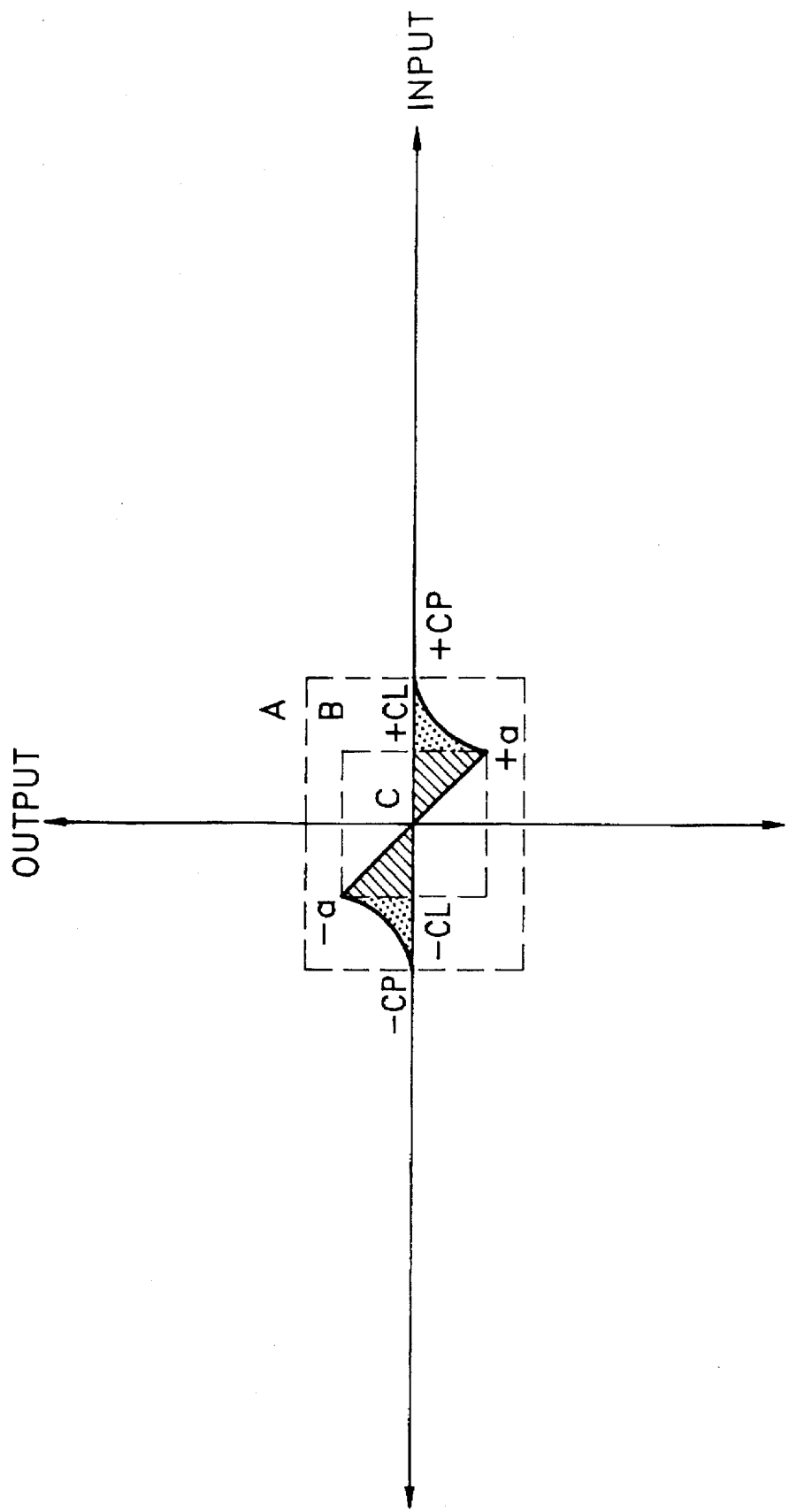

METHOD OF ENHANCING DETAILS CONTAINED IN A COLOR SIGNAL AND A CIRCUIT FOR IMPLEMENTING THE SAME IN A COLOR VIDEO APPARATUS

BACKGROUND OF THE INVENTION

1. Field of Invention

The present invention relates to a method for enhancing details contained in a color signal and a circuit for implementing the same in a color video apparatus. More particularly, the present invention relates to a method and circuit for reducing distortion of low level signals by efficiently separating noise and signal components using correlativity between the respective R, G and B channels.

2. Description of the Related Art

Spatial frequency is a measure of how rapidly a parameter changes over distance in a prescribed spatial direction and is analogous to temporal frequency, which is a measure of how rapidly a parameter changes with the passage of time. In television systems using horizontal scanning lines, horizontal space is conformably mapped to time by the scanning process, so horizontal spatial frequency of the televised image intensity conformably maps to temporal frequency in the video signal which is descriptive of the televised image.

In video cameras using a single pickup device, a color pattern filter may be used to filter light reaching the pickup device so that color signals can be extracted from the electrical signal supplied by the pickup device. The color pattern filter customarily contains stripes transmitting light of three different colors to the pickup device, which may be a vidicon or may be a solid-state imager such as a line-transfer charge-coupled device. The direction of the stripes is perpendicular to the direction of the line scan in the camera, in which the line scan conventionally proceeds in a horizontal direction. The stripes of each color are of uniform width, but the stripes of different colors are preferably of different widths to simplify the separation of color components from the output signal of the pickup device. The respective widths associated with the different colors are usually scaled in regard to the contribution of the particular color to luminance—that is, to reference white. If the color filter comprises red-transmissive, green-transmissive and blue-transmissive stripes, for example, the green-transmissive stripes will be the widest and the blue-transmissive stripes will be the narrowest. The signals picked up by the narrower width stripes have poorer signal-to-noise ratio (S/N), particularly in the higher horizontal spatial frequencies containing detail. When the video camera is used with a video transmission system where the color signals are converted to wideband luminance and narrow-band color-difference signals, the poorer S/N of the colors contributing less to luminance is not of much concern, since detail enhancement or video peaking is usually carried out on the shared luminance high frequencies rather than on individual color signals.

However, the video camera can be used with video equipment in which the color signals are not combined to form luminance and color-difference signals—e.g. certain digital video transmission systems of the so-called RGB type where the red (R), green (G) and blue (B) color signals are separately digitized and coded. In such equipment detail enhancement or video peaking is apt to be performed on the red (R), green (G) and blue (B) color signals themselves. Since the human visual system discriminates poorly between details of colors as those details become finer, enhancement of the color details that have poorer S/N with the color details that have better S/N can result in images that have less apparent noise in them. Random noise in the green (G) color signal is not correlated with random noise in the red (R) and blue (B) color signals, so on average the random noise component of the G signal and the random noise component of another color signal add as quadrature vectors rather than in-phase vectors, which apparently helps the high-frequency S/N when enhancing the detail of that other color signal.

FIG. 1 shows the block diagram of the first embodiment of a conventional detail enhancement circuit, which includes, for a red (R) channel, first and second 1H delay lines 11 and 12, a vertical high-pass filter (V HPF) weight-and-sum circuit 13, a horizontal low-pass filter (H LPF) 14, a horizontal high-pass filter (H HPF) 15, first adder 16, a ROM 17 in which a noise cancelling and detail enhancement amount determining look-up table (LUT) is stored, and a second adder 18. This structure is also applied to green (G) and blue (B) channels.

FIG. 2 is a graph showing input-versus-output characteristics of the noise cancelling and detail enhancement amount determining look-up table (LUT) stored in ROM 17 of FIG. 1.

The first embodiment of the conventional detail enhancement circuit will now be described with reference to FIGS. 1 and 2.

The first delay line 11 delays an image signal of the R channel by a 1H period and the second delay line 12 delays the 1H-delayed image signal output from first delay line 11 by another 1H period. Here, the image signal output from the first and second delay lines 11 and 12 is a gamma-corrected signal.

The V HPF weight-and-sum circuit 13 performs a high-pass filtering operation with respect to the original signal, 1H-delayed signal and 2H-delayed signal output from first and second delay lines 11 and 12, respectively, to extract vertical detail components present in a predetermined high-frequency band.

The H LPF 14 performs a horizontal low-pass filtering operation with respect to vertical detail components output from the V HPF weight-and-sum circuit 13 to eliminate diagonal detail components contained in the vertical detail components output from V HPF weight-and-sum circuit 13, thereby preventing double enhancement of the diagonal detail components.

The H HPF 15 performs a horizontal high-pass filtering operation with respect to the 1H-delayed image signal output from the first delay line 11 to extract horizontal detail components present in a predetermined high-frequency band.

The first adder 16 sums the vertical detail components output from the H LPF 14 with the horizontal detail components output from the H HPF 15. The summed output is applied to ROM 17 in which the noise cancelling and detail enhancement amount determining look-up table (LUT) is stored.

The input-versus-output characteristics of the noise cancelling and detail enhancement amount determining look-up table (LUT) are the same as those in FIG. 2. At this time, input signals (the abscissa) are divided into a section A, a section B and a section C. Here, a critical point (CP) represents a boundary value between the sections A and B, that is, a reference value for noise identification.

If the signal level applied to ROM 17 is greater than +CP or less than −CP (i.e., is within the A section), the LUT stored within ROM 17 determines and outputs the corresponding amount of detail enhancement, ranging from zero to the respective maximum detail enhancement amounts ($DE_{max}$ and $-DE_{max}$) with respect to the magnitude of the input horizontal and vertical detail components, as shown in FIG. 2.

On the other hand, if the signal level applied to ROM 17 is less than +CP or greater than −CP (i.e., is within the B and C sections), the LUT stored within ROM 17 functions for cancelling the high-spatial-frequency noise.

That is to say, if an input signal is present between −CL and +CL (i.e., is in the C section), the signal output from ROM 17 is a signal corresponding to inverted high-frequency noise. When the input signal to ROM 17 is primarily high-frequency noise from the R signal, which is applied as one summand to the second adder 18, the inverted high-frequency noise output from ROM 17, which is applied as another summand to the second adder 18, cancels the high-frequency noise from the R' signal supplied from second adder 18. That is to say, if the input signal level to ROM 17 is between −CL and +CL (i.e., is in the C region), the corresponding output signal level read from ROM 17 is the same amplitude as the input signal, but is of opposite polarity, as shown in FIG. 2.

If an input signal is present between −CP and −CL, or between +CL and +CP (i.e., is in the B section), the output signal level is expressed in the form of an exponentially increasing function as the input signal level ranges upward from a point +a to the point on the abscissa corresponding to +CP, or ranges downward from the point −a to the point on the abscissa corresponding to −CP, as shown in FIG. 2.

In other words, the horizontal and vertical detail components input to ROM 17 determine the types of output signals depending on the respective magnitudes thereof. If the magnitude of the input signal is less than the absolute value of CP, a noise-cancelled horizontal and vertical detail component is output. If the magnitude of the input signal is greater than the absolute value of CP, a horizontal and vertical detail component whose corresponding detail enhancement amount is determined is output.

The second adder 18 functions to add or subtract a high-frequency component output form the LUT stored in ROM 17 with respect to the 1H-delayed signal output from first delay line 11. At this time, the second adder 18 functions as a noise canceler unit during subtraction and functions as a detail enhancer during addition.

FIG. 3 shows a block diagram of a second embodiment of the conventional detail enhancement circuit, which includes, for a red (R) channel, first and second delay lines 31 and 32, a vertical low-pass filter (V LPF) weight-and-sum circuit 33, a horizontal low-pass filter (H LPF) 34, a subtracter 35, a ROM 36 in which a noise cancelling and detail enhancement amount determining look-up table (LUT) is stored, and an adder 37. This structure is also applied to the green (G) and blue (B) channels.

FIG. 4 is a graph showing input-versus-output characteristics of the noise cancelling and detail enhancement amount determining look-up table (LUT) stored in ROM 36 of FIG. 3.

The second embodiment for the conventional detail enhancement circuit will now be described with reference to FIGS. 3 and 4. Here, descriptions of parts that are the same as those in the first embodiment will be omitted.

The V LPF weight-and-sum circuit 33 performs a low-pass filtering operation with respect to the original signal, 1H-delayed signal and 2H-delayed signal output from first and second delays 31 and 32, respectively, to extract a vertical low-frequency band.

The H LPF 34 performs a horizontal low-pass filtering operation with respect to the vertical low-frequency band output from V LPF weight-and-sum circuit 33 to extract a diagonal low-frequency band contained in the vertical low-frequency band output from V LPF weight-and-sum circuit 33.

The subtracter 35 subtracts the diagonal low-frequency band contained in the vertical low-frequency band output from H LPF 34 from the 1H-delayed image signal output from first delay line 31 to output a high frequency component around current data, that is, the horizontal and vertical detail components.

Operation of ROM 36 and adder 37 is the same as in the first embodiment.

However, the aforementioned conventional detail enhancement circuits each functions as a noise canceler by inverting an input signal by 180° inphase if the level of the signal input to the LUT stored in the ROM is less than a critical level (CL). As the result, the following drawbacks are caused.

First, in the case of a low level input signal whose high-frequency component is less than a critical level (CL), the input signal is always regarded as noise, which is, in turn, cancelled from the original signal. Second, in order to solve the first drawback, if the critical level (CL) is decreased, the advantage of the detail enhancement circuit as a noise canceler is reduced.

Third, if the amount of variation of the color signal is large and the color signal level input to a channel is less than the critical level, the color signal input to the corresponding channel is cancelled, thereby changing the color signal.

SUMMARY OF THE INVENTION

To solve the above-described problems, it is, therefore, an object of the present invention to provide a detail enhancement method for improving a signal-to-noise (S/N) ratio by performing a detail enhancing function or a noise cancelling function after the signal and noise are accurately discriminated using the correlativity between red (R), green (G) and blue (B) channels and the level of a signal input to the respective channels.

It is another object of the present invention to provide a detail enhancement circuit suitable for implementing the detail enhancement method.

To accomplish the first object, there is provided a detail enhancement method comprising the steps of:

extracting horizontal and vertical detail components contained in an input image signal supplied from at least one channel among red (R), green (G) and blue (B) channels;

determining whether the horizontal and vertical detail components correspond a signal or noise by checking correlativity between said R, G and B channels and amplitude of the horizontal and vertical detail components;

cancelling noise by coring the horizontal and vertical detail components output for the respective channels if the horizontal and vertical detail components is determined as the noise in the signal/noise determining step, and determining and outputting the detail enhancement amount corresponding to the amplitude of detail components if the horizontal and vertical detail components is determined as the signal; and outputting a detail-enhanced image signal for the respective channels obtained by summing the 1H-delayed signal of the image signal supplied from at least one channel among the R, G and B channels, with the horizontal/vertical detail components whose detail enhancement amount is determined, or whose noise is cancelled.

To accomplish the second object of the present invention, there is provided a detail enhancement circuit comprising:

means for extracting horizontal and vertical detail components contained in an input image signal supplied from at least one channel among R, G and B channels;

a controller for determining whether the horizontal and vertical detail components correspond a signal or noise by checking correlativity between the R, G and B channels and amplitude of the horizontal and vertical detail components and outputting a selection control signal for selecting a Is corresponding look-up table;

a ROM for storing a first look-up table for determining and outputting a detail enhancement amount corresponding to the amplitude of detail components and a second look-up table for cancelling the noise of the input image signal are stored, and supplying output from the look-up table selected according to the selection control signal; and means for outputting a detail-enhanced image signal for the respective channels obtained by summing the 1H-delayed signal of said image signal supplied from at least one channel among the R, G and B channels, with the horizontal/vertical detail components whose detail enhancement amount is determined, or whose noise is cancelled, in the ROM.

BRIEF DESCRIPTION OF THE DRAWINGS

The above objects and advantages of the present invention will become more apparent by describing in detail a preferred embodiment thereof with reference to the attached drawings in which:

FIGS. 6A and 6B are graphs showing one input-versus-output characteristic of first and second LUTs stored in the ROM shown in FIG. 5, respectively;

DETAILED DESCRIPTION OF THE PREFERRED EMBODIMENT

Figure 1:
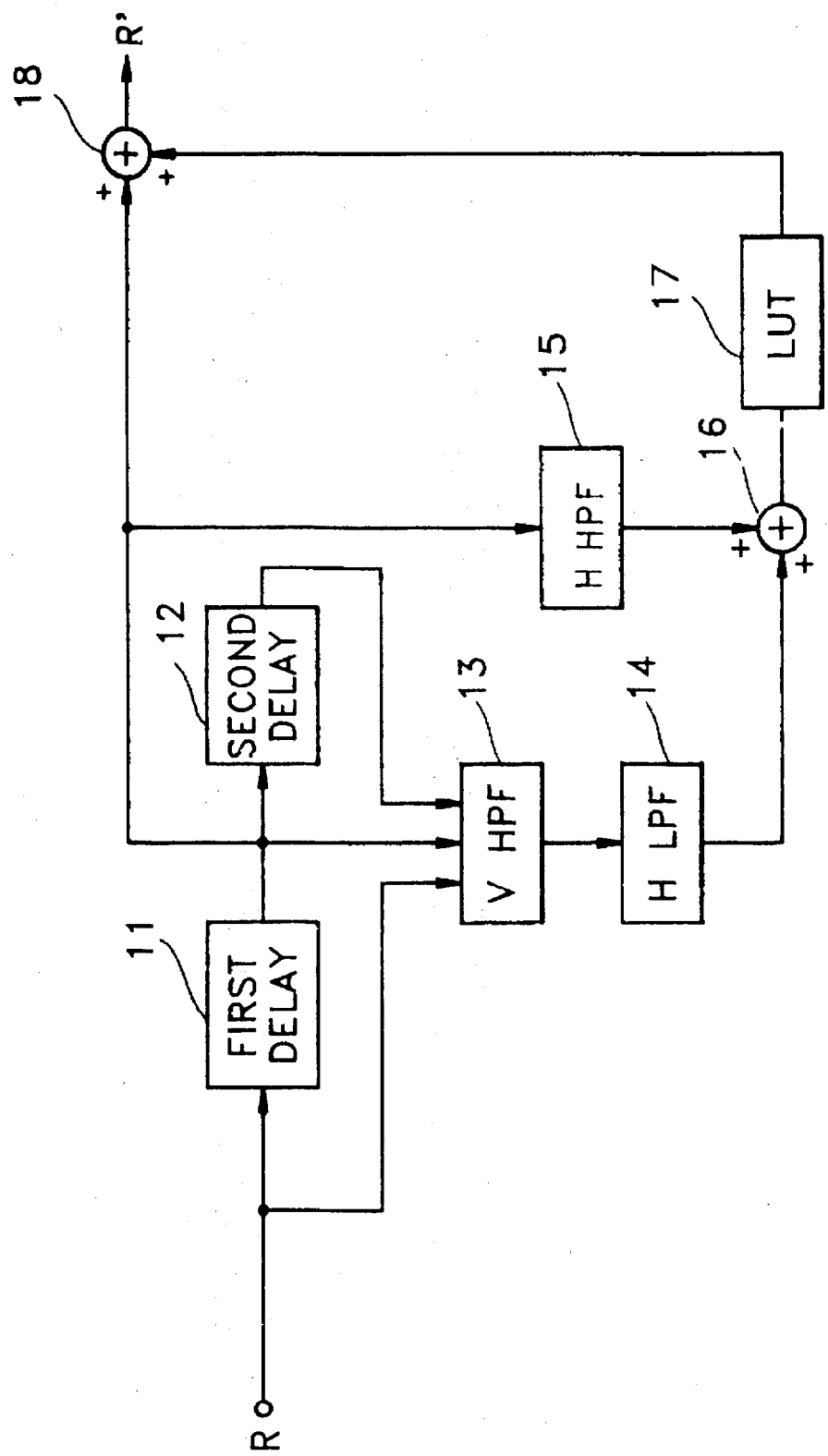
FIG. 1 is a block diagram of a conventional detail enhancement circuit according to a first embodiment.
Figure 2:
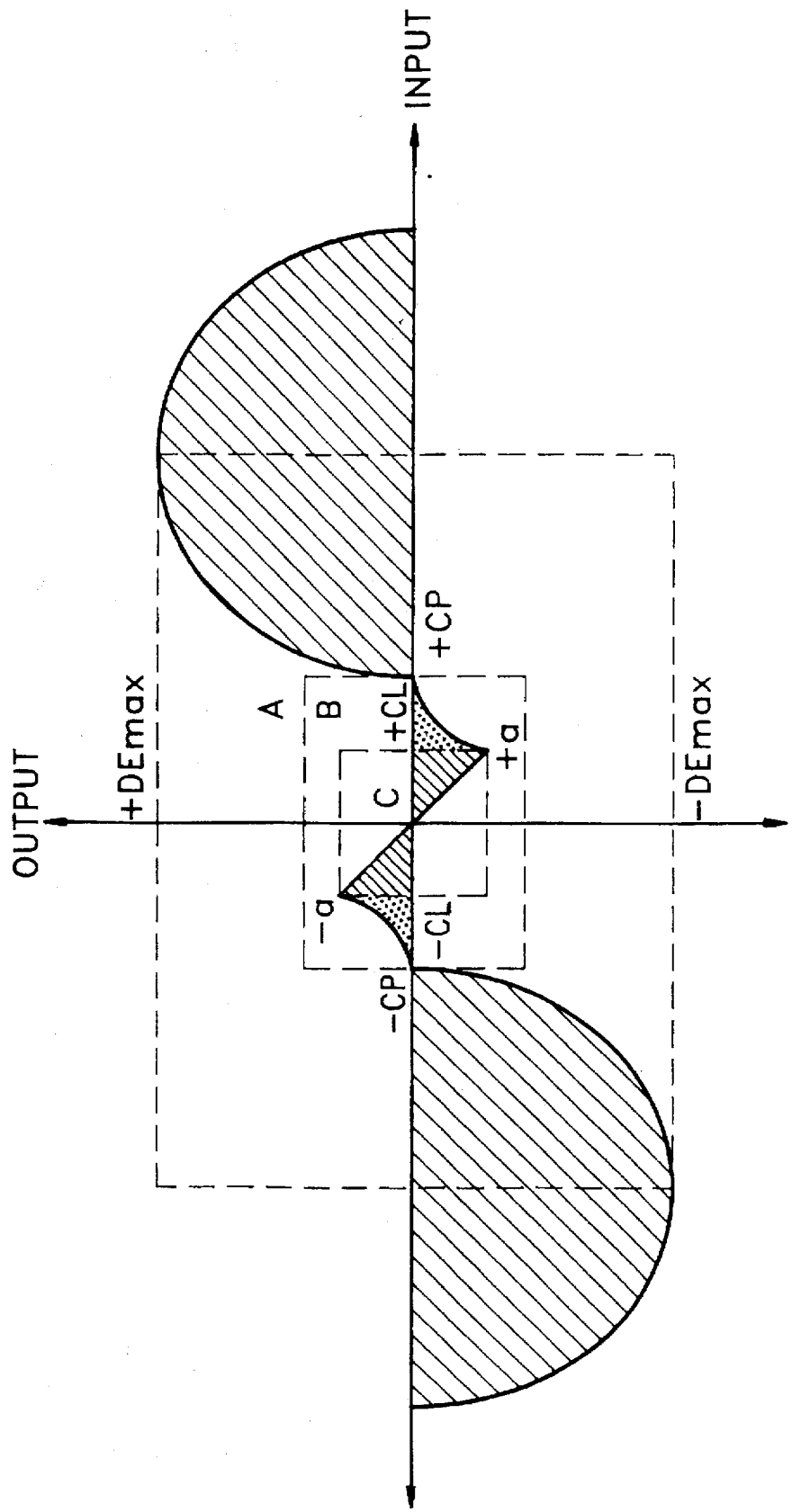
FIG. 2 is a graph showing the input-versus-output characteristics of an look-up table (LUT) stored in the ROM shown in FIG. 1.
Figure 5:
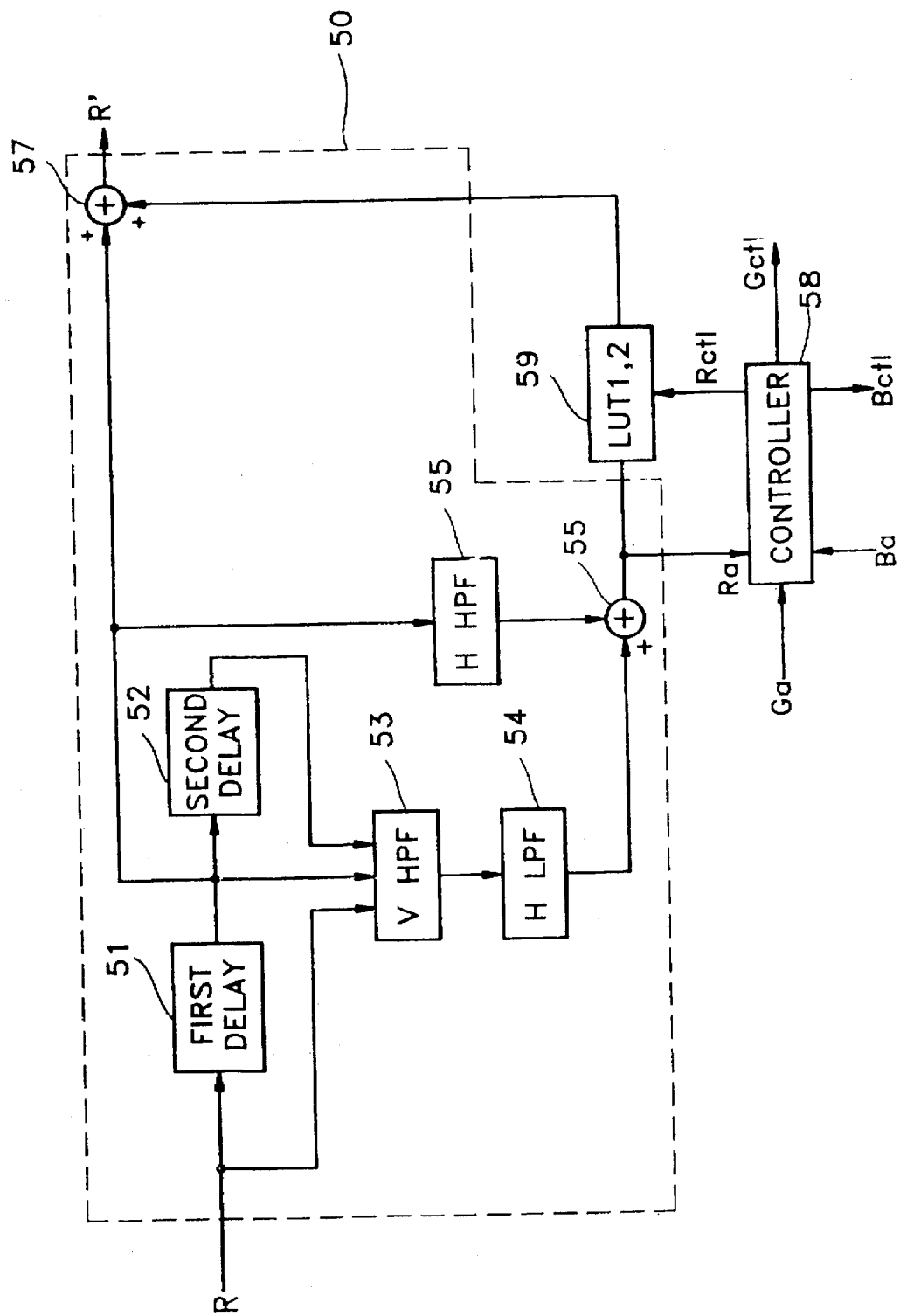
FIG. 5 is a block diagram of a detail enhancement circuit according to a first embodiment of the present invention.
Figure 6A:
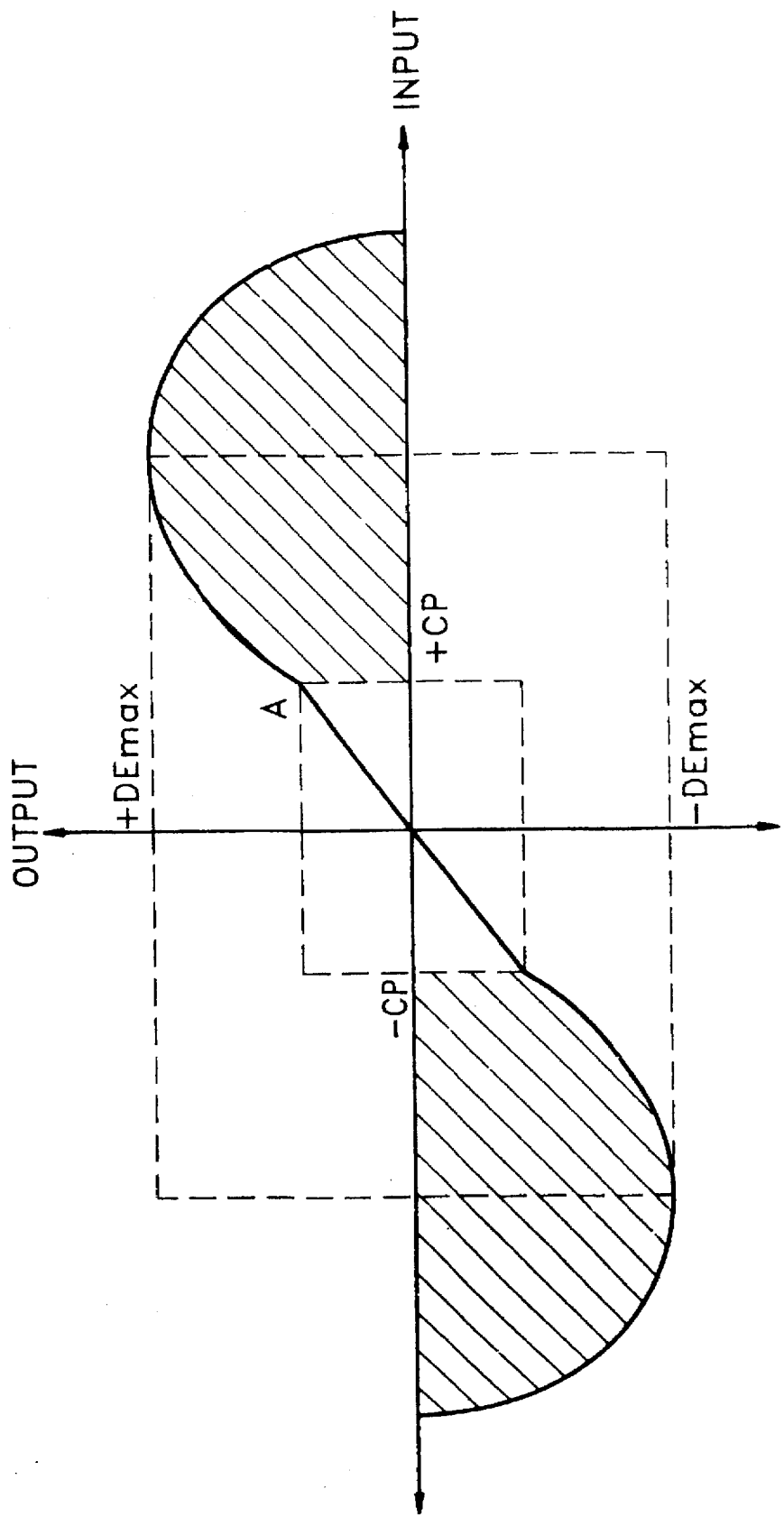

In FIG. 5, the detail enhancement circuit according to a first embodiment of the present invention includes a controller 58, and a ROM 59 in which first and second look-up tables LUT1 and LUT2 are stored, for use with a circuit 50, excluding a part corresponding to ROM 17 of the conventional detail enhancement circuit shown in FIG. 1. FIGS. 6A and 6B are graphs showing one form of the input-versus-output characteristics of first and second look-up tables LUT1 and LUT2 stored in ROM 59 shown in FIG. 5, respectively.

Figure 7:
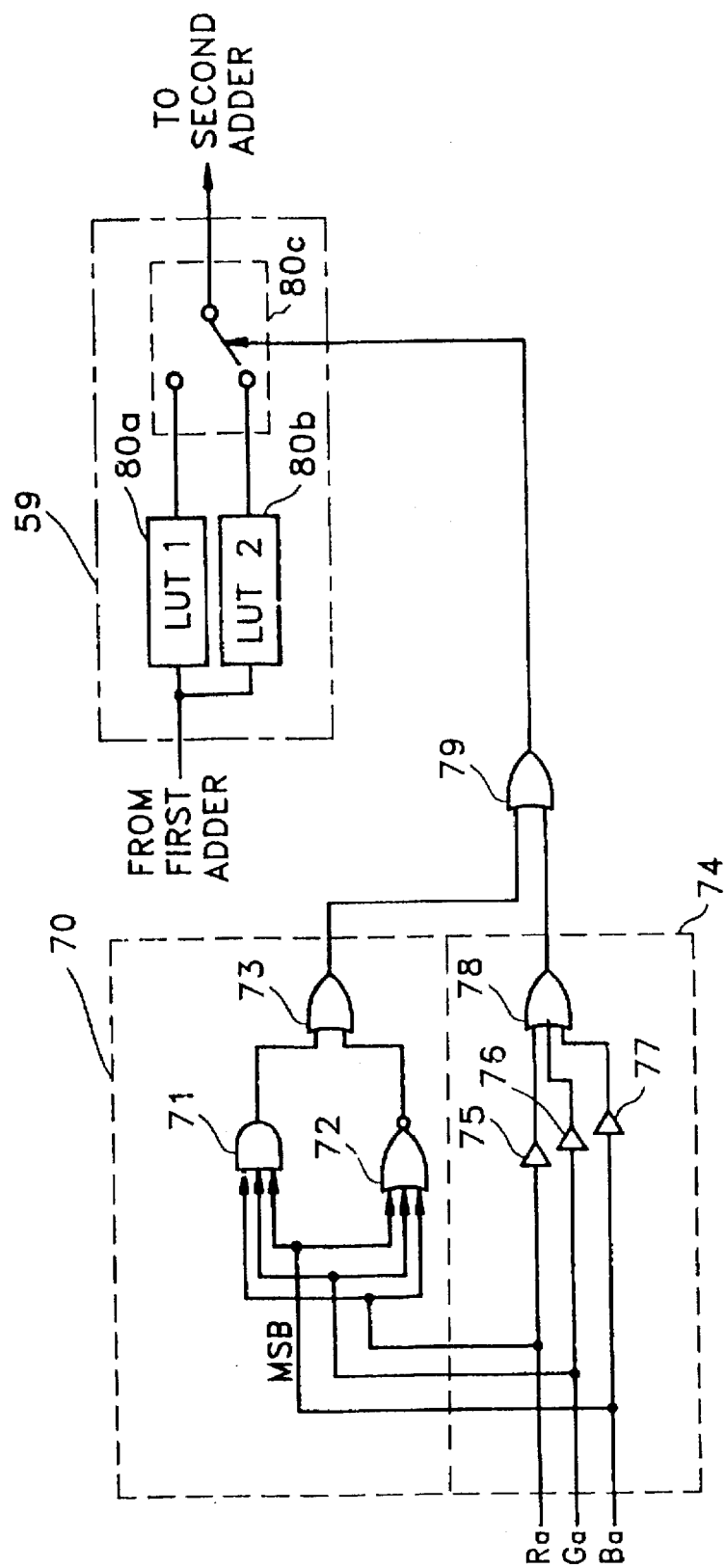
FIG. 7 is a detailed block diagram of a controller shown in FIG. 5.

FIG. 7 is a detailed block diagram of the controller 58 and ROM 59 shown in FIG. 5. The controller 58 includes an RGB channel correlativity determiner 70, an RGB signal level determiner 74 and an OR gate 79 as a control signal output unit. ROM 59 includes the first look-up table 80a, the second look-up table 80b and a selector 80c.

The RGB channel correlativity determiner 70 includes an AND gate 71, a NOR gate 72 and an OR gate 73. The RGB signal level determiner 74 includes three inverters 75, 76 and 77 and an OR gate 78.

Figure 8:
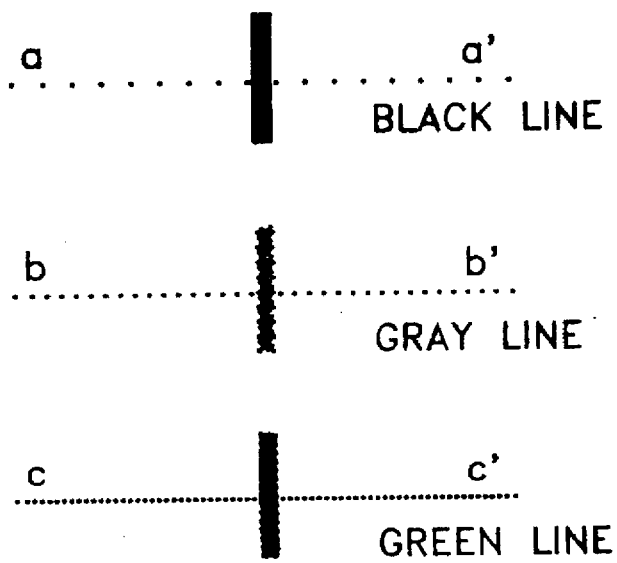
FIG. 8 shows vertical line photographed screens of an image signal.
Figure 9A:
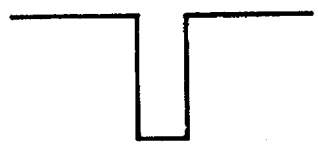
FIGS. 9A and 9B show signals at system inputs aa' and bb' in FIG. 8, respectively.
Figure 9B:

FIG. 8 shows image signals displayed on a screen when black, gray and green colors taken along lines aa', bb' and cc', respectively, are vertically formed on a white background part during signal photographing operation. FIGS. 9A and 9B show signals of a line when the black color signal and the gray color signal shown in FIG. 8 are taken along the horizontal lines aa' and bb', respectively.

Figure 10A:
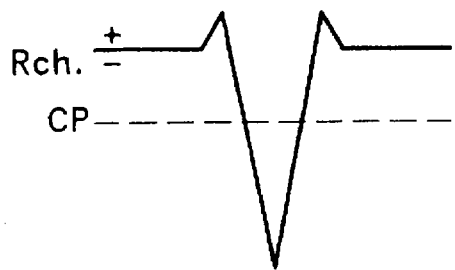
FIG. 10 shows signals obtained by performing horizontal and vertical filtering operations with respect to the signal shown in FIG. 9A and summing the result, for R, G and B channels.
Figure 11A:
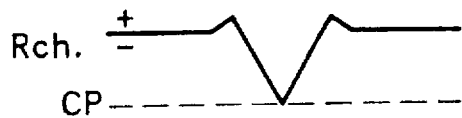
FIG. 11 shows signals obtained by performing horizontal and vertical filtering operations with respect to the signal shown in FIG. 9B and summing the result, for R, G and B channels.
Figure 10B:
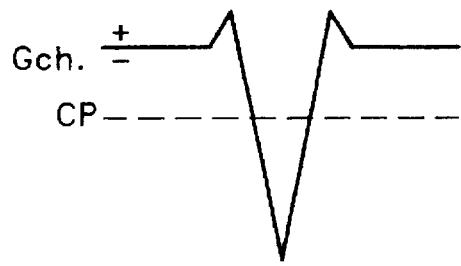
Figure 11B:
Figure 10C:
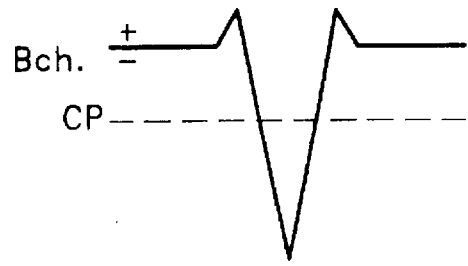
Figure 11C:
Figure 12A:
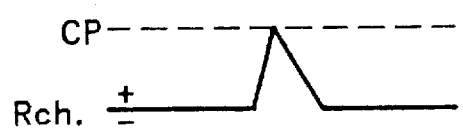
FIG. 12 shows signals obtained by performing horizontal and vertical filtering operations with respect to the signal for the input cc' of the image shown in FIG. 8 and summing the result, for R, G and B channels.
Figure 13A:
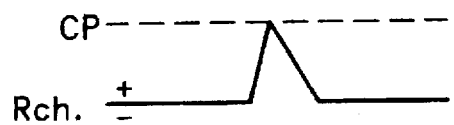
FIG. 13 shows a signal discriminated as noise for R, G and B channels.
Figure 12B:
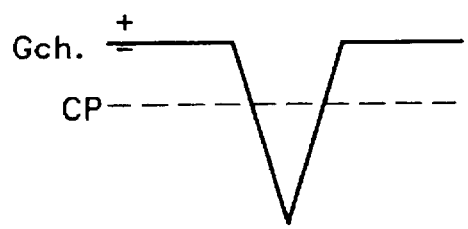
Figure 13B:
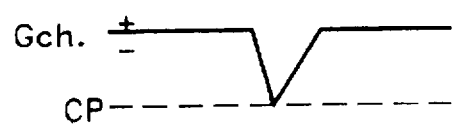
Figure 12C:
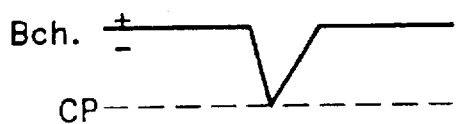
Figure 13C:
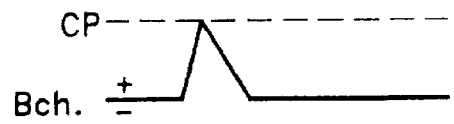

FIG. 10 shows signals obtained by performing horizontal and vertical filtering operations with respect to the signal shown in FIG. 9A and summing the result, for R, G and B channels. FIG. 11 shows signals obtained by performing horizontal and vertical filtering operations with respect to the signal shown in FIG. 9B and summing the result, for R, G and B channels. FIG. 12 shows signals obtained by performing horizontal and vertical filtering operations with respect to the green color signal for the line cc' in FIG. 8 and summing the result, for R, G and B channels. FIG. 13 shows a signal discriminated as the noise for R, G and B channels.

Figure 3:
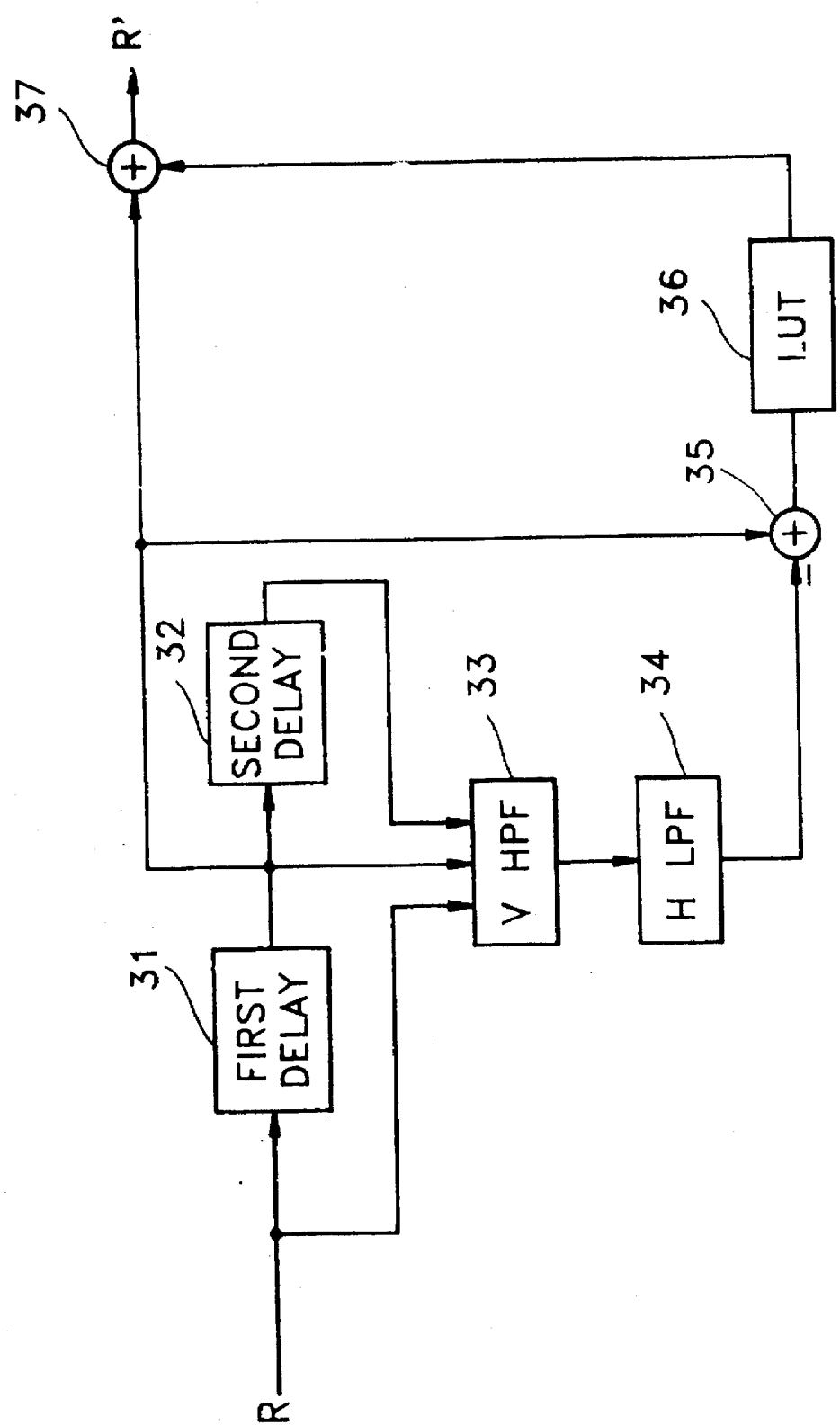
FIG. 3 is a block diagram of a conventional detail enhancement circuit according to a second embodiment.
Figure 4:
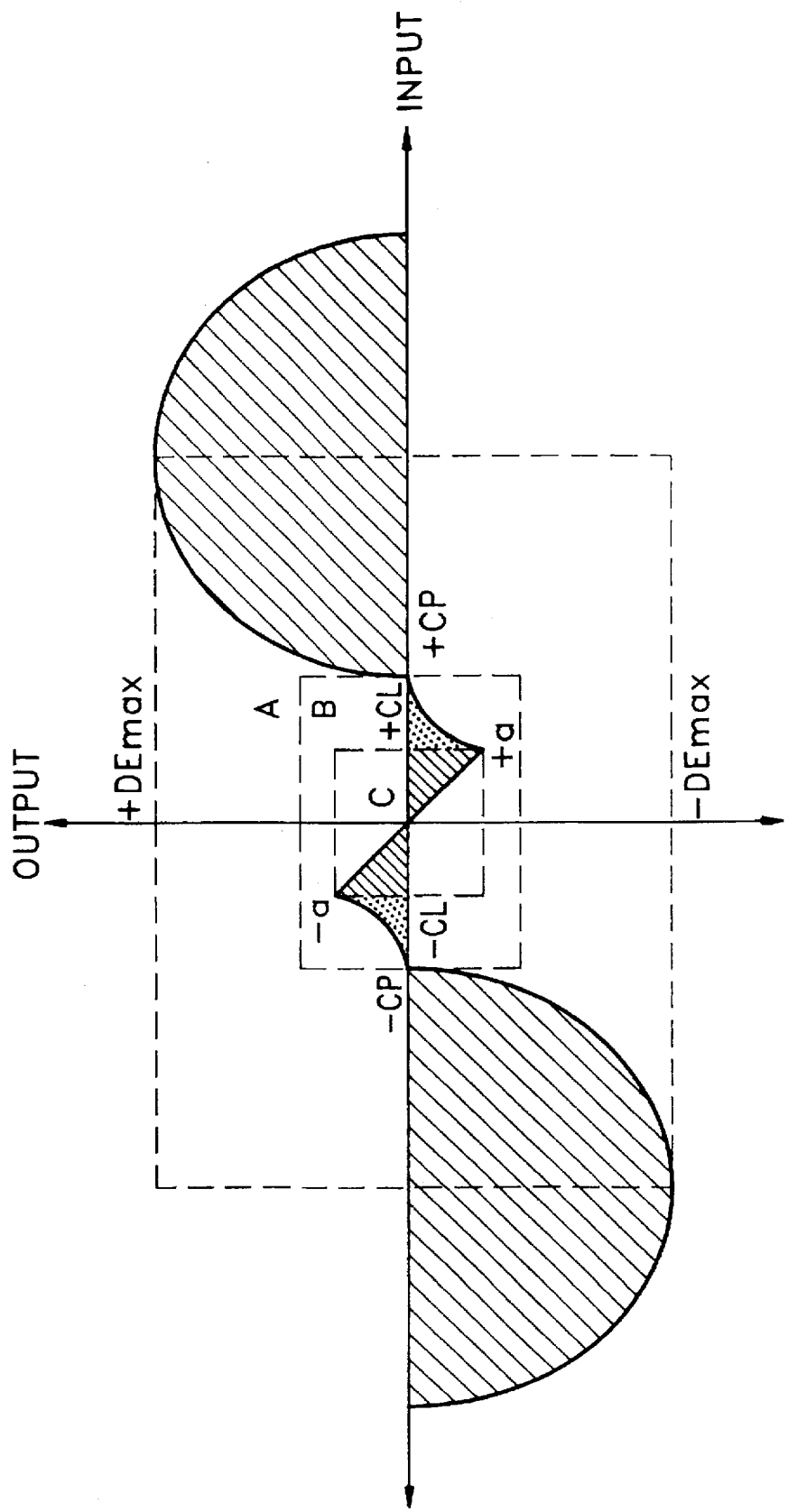
FIG. 4 is a graph showing the input-versus-output characteristics of an LUT stored in the ROM shown FIG. 3.
Figure 14:
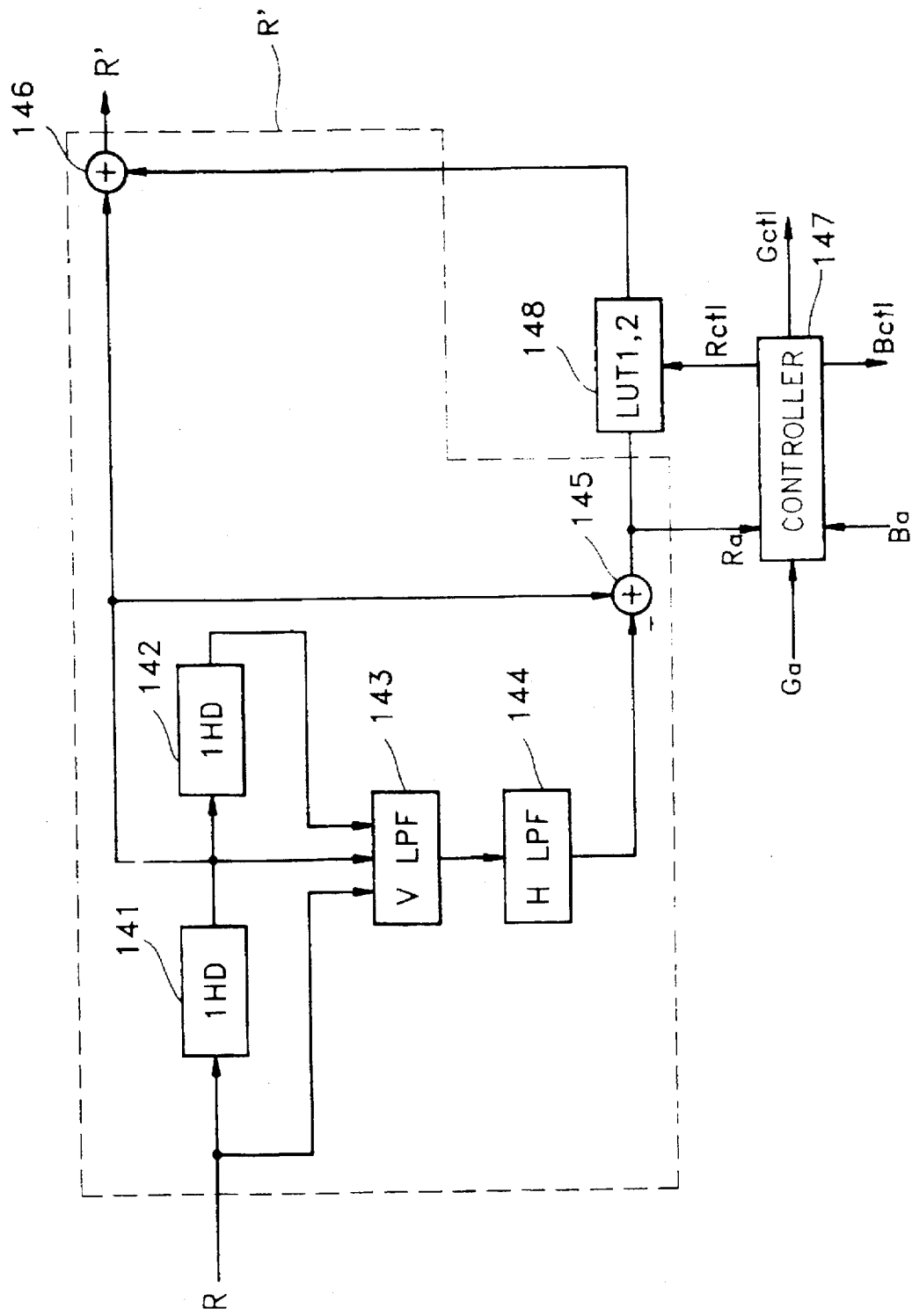
FIG. 14 is a block diagram of a detail enhancement circuit according to a second embodiment of the present invention.

FIG. 14 is a block diagram of a detail enhancement circuit according to a second embodiment of the present invention, which includes a controller 147 and a ROM 148 in which first and second look-up tables LUT1 and LUT2 are stored, for use with a circuit 140, excluding a part corresponding to ROM 17 of the conventional detail enhancement circuit shown in FIG. 3.

Figure 15:
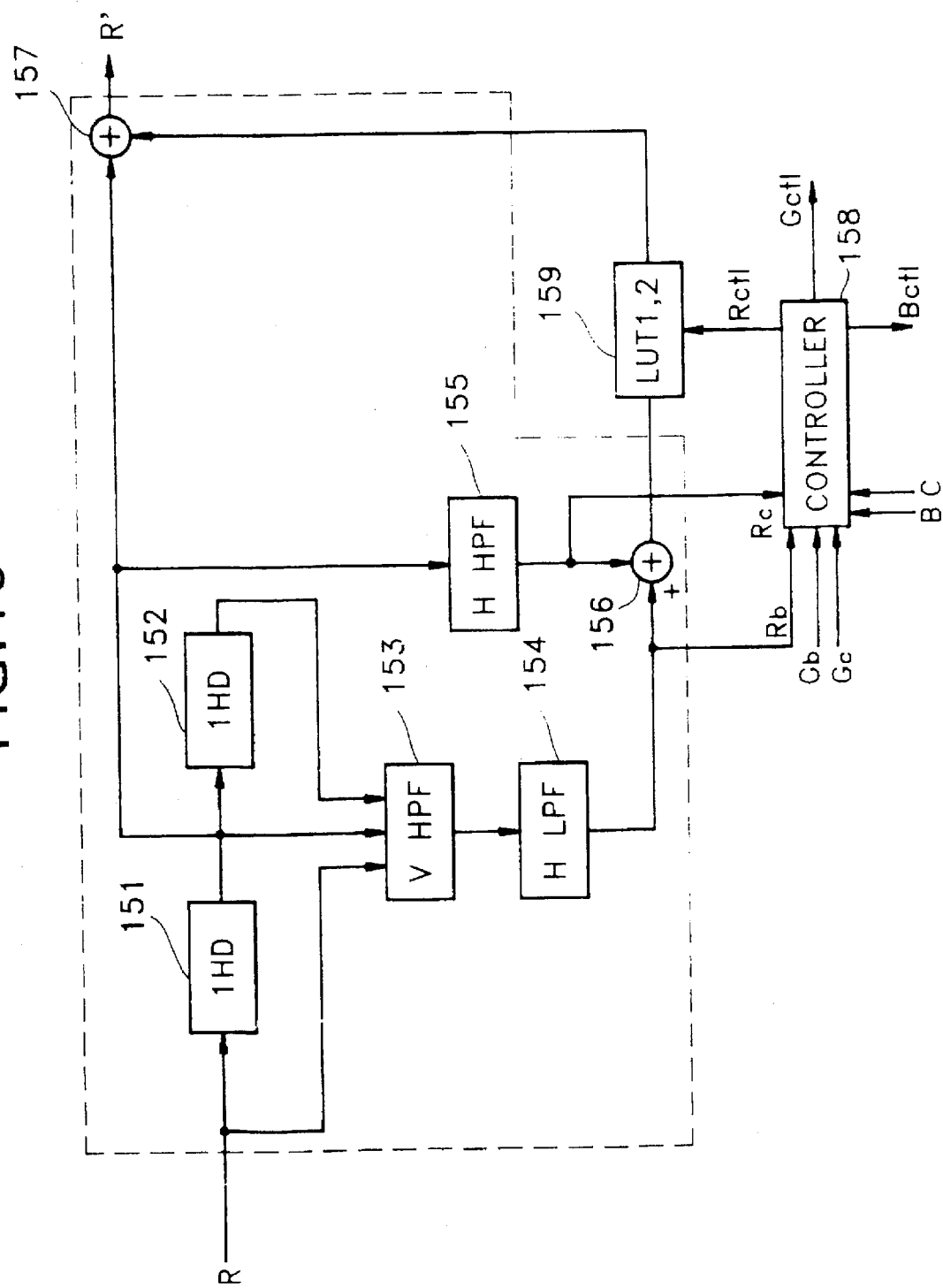
FIG. 15 is a block diagram of a detail enhancement circuit according to a third embodiment of the present invention.

FIG. 15 is a block diagram of a detail enhancement circuit according to a third embodiment of the present invention, which includes a controller 158 and a ROM 159 in which first and second look-up tables LUT1 and LUT2 are stored, for use with a circuit 150, excluding a part corresponding to ROM 17 of the conventional detail enhancement circuit shown in FIG. 3.

Figure 16:
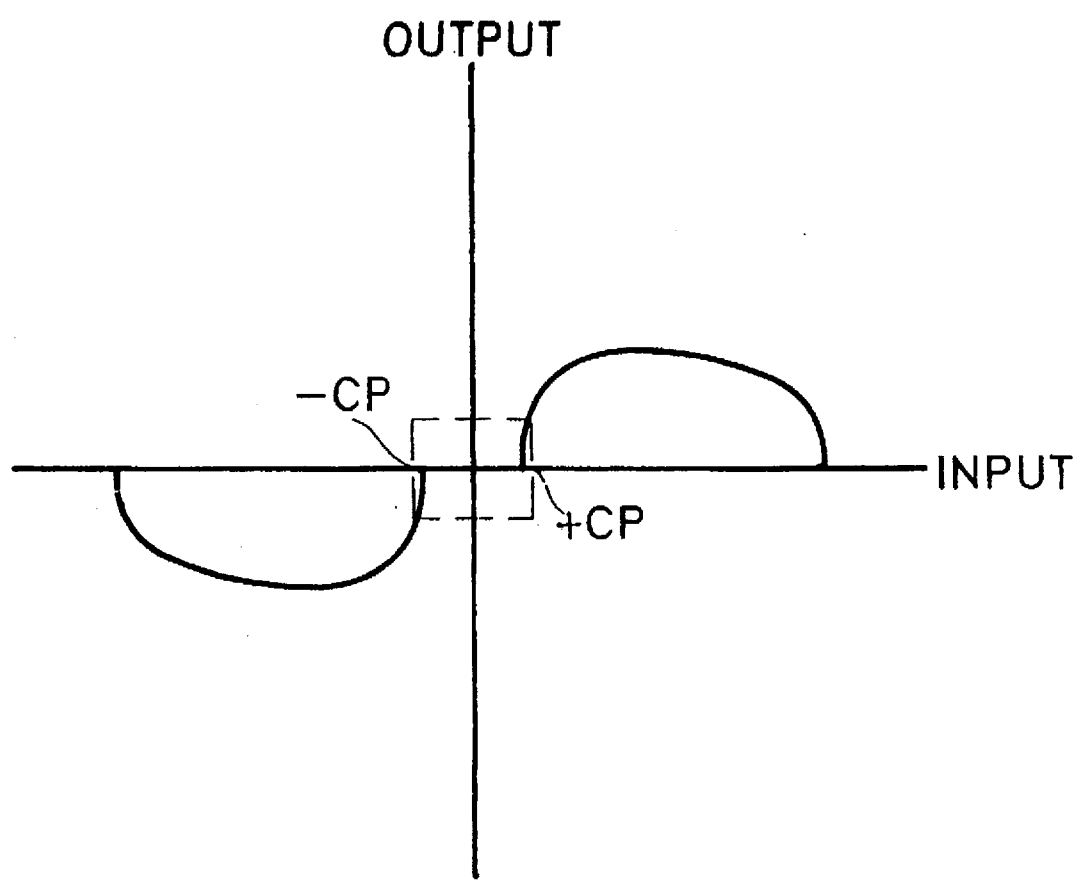
FIG. 16 is a graph showing another input-versus-output characteristics of a first LUT (LUT1) stored in the ROM shown in FIGS. 5, 14 and 15.

FIG. 16 is a graph showing another form of the input-versus-output characteristics of the first LUT (LUT1) stored in the ROM shown in FIGS. 5, 14 and 15.

Figure 17:
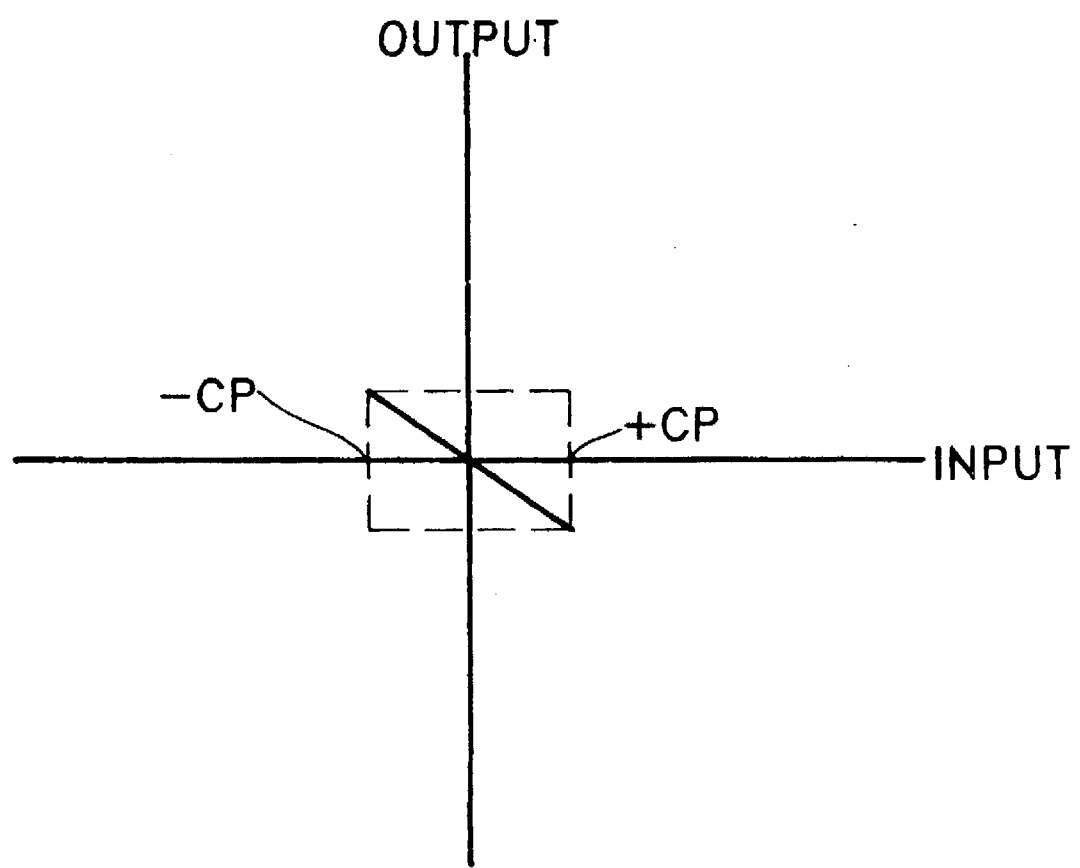
FIG. 17 is a graph showing another input-versus-output characteristics of a second LUT (LUT2) stored in the ROM shown in FIGS. 5, 14 and 15.

FIG. 17 is a graph showing another form of the input-versus-output characteristics of the second LUT (LUT2) stored in the ROM shown in FIGS. 5, 14 and 15.

Now, the operation of the present invention will be described in detail and descriptions of the parts which are the same as those in the conventional detail enhancement circuit will be omitted herein.

In the controller 58, the RGB channel correlativity determiner 70 detects the sign of the signal Ra supplied from the first adder 55 with respect to the R channel, as well as the signals Ga and Ba with respect to the G and B channels (not shown) and discriminates whether the signs of the Ra, Ga and Ba signals are identical, thereby determining the sign correlativity among the Ra, Ga and Ba signals. The following Table 1 is an input-versus-output table of the RGB channel correlativity determiner 70. In Table 1, if the sign of the R, G or B signal is negative, it is designated by '1', and if the sign is positive, it is I0 designated by '0'.

TABLE 1

| Ra | Ga | Ba | Output |
|----|----|----|--------|
| 0  | 0  | 0  | 1      |
| 0  | 0  | 1  | 0      |
| 0  | 1  | 0  | 0      |
| 0  | 1  | 1  | 0      |
| 1  | 0  | 0  | 0      |
| 1  | 0  | 1  | 0      |
| 1  | 1  | 0  | 0      |
| 1  | 1  | 1  | 1      |

That is, the RGB channel correlativity determiner 70 outputs a '1' if correlativity between R, G and B channels exists, and it outputs a '0' otherwise.

The RGB signal level determiner 74 compares the magnitude of the signal Ra supplied from the first adder 55 with respect to the R channel as well as the signals Ga and Ba with respect to the G and B channels (not shown). The following Table 2 is an input-versus-output table of the RGB signal level determiner 74, in which '1' designates that the R, G or B signal is greater than CP, and '0' designates that the R, G or B signal is less than CP.

TABLE 2

| R | G | B | Output |
|---|---|---|--------|
| 0 | 0 | 0 | 0      |
| 0 | 0 | 1 | 1      |
| 0 | 1 | 0 | 1      |
| 0 | 1 | 1 | 1      |
| 1 | 0 | 0 | 1      |
| 1 | 0 | 1 | 1      |
| 1 | 1 | 0 | 1      |
| 1 | 1 | 1 | 1      |

The OR gate 79 (control signal output unit) performs an OR operation with respect to the outputs of the RGB channel correlativity determiner 70 and RGB signal level determiner 74 to output a control signal to selector 80c for selecting a look-up table.

The following Table 3 is an input-versus-output table of the OR gate 79. In Table 3, '1' designates the case when the first look-up table LUT1 80a is selected, and '0' designates the case when the second look-up table LUT2 80b is selected.

TABLE 3

|                          | CP > Signal level | CP < Signal level |
|--------------------------|-------------------|-------------------|
| Presence of correlativity | 0                 | 1                 |
| Absence of correlativity  | 1                 | 1                 |

In the case of using a triple-panel charge coupled device (CCD), data types of the respective R, G and B channels obtained from a black-and-white object to be photographed are identical. Therefore, the phases of the signals output from a spatial filter are the same when the spatial filter in the same band is used. At this time, an example of the waveforms are shown in FIGS. 10 and 11. In other words, as shown in FIG. 10, if a large changing black-and-white signal is input, a DC offset is eliminated in the output of the spatial filter so that a signal swinging around zero is output. In such a signal as shown in FIG. 11, the phases indicated as a positive (+) or negative (−) sign signal are identical. That is, as above, when the sign portion of the signal is the same and the signal level is greater than a critical point (CP), ROM 59 performs a detail enhancer operation by using the first look-up table LUT1 80a.

On the other hand, as shown in FIG. 11, if a small changing black-and-white signal is input, the sign portion of the signal is the same and the signal level is less than a critical point (CP). Generally, a signal has correlativity among R, G and B channels, whereas noise, being irregular, has no correlativity among R, G and B channels. Therefore, if the signs of the signals of the respective channels are identical with one another, the input image signal is likely to be considered as signal components. For the foregoing reasons, when the sign portion of the signal is the same and the signal level is less than a critical point (CP), ROM 59 performs a detail enhancer operation by using the first look-up table LUT1 80a.

If a large changing color signal is input, the channel output corresponding to the color signal level becomes larger. At this time, an example of the waveforms for the respective channels are shown in FIG. 12. In other words, the signal shown in FIG. 12 is for the case of a comparatively large signal present in the G channel when green vertical lines are present. In such a case, although signs of the respective channels are not the same with one another, since a large changing color signal, exceeding a general noise level, is present in any channel among the R, G and B channels, the signal is considered to be a signal component. Thus, for the foregoing reason, when the sign portion of the signal is not the same and the signal level is greater than a critical point (CP), ROM 59 performs a detail enhancement operation by using the first look-up table LUT1 80a.

On the other hand, as shown in FIG. 13, in the case of a signal having different sign portions of the R, G or B signals and a small color change, the respective signal levels of the R, G and B channels are at the general noise level. Also, since there is no correlativity among the respective R, G and B channels, the input image signal is considered as noise. Thus, for the foregoing reason, when the sign portion of the signal is not the same and the signal level is less than a critical point (CP), ROM 59 performs a noise cancellation operation by using the second look-up table LUT2 80b.

FIGS. 6A and 16 show graphs showing examples of the input-versus-output characteristics of LUT1 80a and FIGS. 6B and 17 show graphs showing examples of the input-versus-output characteristics of LUT2 80b.

As described above, in the detail enhancement method and circuit according to the present invention, a separability of signal and noise components is improved by checking the correlativity among R, G and B channels and the levels of the signals input to the respective channels. Therefore, even if a high-pass frequency component of the input signal is smaller than a critical value, the input signal is accurately separated as a signal or a noise component. Then, the signal is cancelled only when the input signal is classified as the noise component.

Also, even if the level of the signal of a channel, except for the channel experiencing a large color change, is smaller than the critical value, the signal of the channel experiencing a small color change is not cancelled. Therefore, there is no change in a color signal.

What is claimed is:

1. A detail enhancement method, comprising:
    extracting horizontal and vertical detail components contained in an input image signal supplied from at least one channel among red (R), green (G) and blue (B) channels;
    determining whether said horizontal and vertical detail components correspond to one of a signal and a noise component of the input image signal based on correlativity between the signals of said R, G and B channels and amplitudes of said horizontal and vertical detail components;
    cancelling noise by removing said horizontal and vertical detail components if said horizontal and vertical detail components are determined as the noise component, and determining and outputting a detail enhancement amount corresponding to the amplitude of said horizontal and vertical detail components if said horizontal and vertical detail components are determined as the signal component; and
    outputting a detail-enhanced image signal for said respective channels obtained by summing said image signal supplied from at least one channel among said R, G and B channels and delayed by a predetermined amount, with said horizontal and vertical detail components having one of the determined detail enhancement amount and the noise component cancelled.

2. A detail enhancement method as claimed in claim 1, wherein, in determining whether said horizontal and vertical detail components correspond to one of a signal and a noise component of the input image signal, it is determined whether said horizontal and vertical detail components are signal or noise components by detecting signs of the image signal passing through a spatial filter and comparing the detected sign and the amplitude of the signal passing through a spatial filter with a sign and amplitude, respectively, of signals of the other channels among the R, G and B channels.

3. A detail enhancement method as claimed in claim 1, wherein said delay of a predetermined amount corresponds to a delay of one horizontal line.

4. A detail enhancement circuit, comprising:
    means for extracting horizontal and vertical detail components contained in an input image signal supplied from at least one channel among R, G and B channels;
    a controller for determining whether said horizontal and vertical detail components correspond to one of a signal and noise component based on correlativity between signals of said R, G and B channels and amplitudes of said horizontal and vertical detail components and outputting a selection control signal for selecting one of a first look-up table and a second look-up table;
    a ROM for storing the first look-up table for determining and outputting a detail enhancement amount corresponding to the amplitudes of the horizontal and vertical detail components and the second look-up table for cancelling a noise component of said input image signal, and supplying an output signal from one of the first and second look-up tables selected according to said selection control signal; and
    means for outputting a detail-enhanced image signal for said respective channels obtained by summing said image signal delayed by a predetermined amount and supplied from at least one channel among said R, G and B channels, with the horizontal and vertical detail components having one of its detail enhancement amount determined and its noise cancelled, based on said first and second look-up tables stored in said ROM.

5. A detail enhancement circuit as claimed in claim 4, wherein, if said controller determines that the horizontal and vertical detail components correspond to the signal component, the corresponding detail enhancement amount of said detail components is determined among detail enhancement amounts ranging from zero to a maximum detail enhancement amount depending on the amplitudes of said horizontal and vertical detail components, by said first look-up table, to then be output.

6. A detail enhancement circuit as claimed in claim 4, further comprising an adder for adding the horizontal and vertical detail components and outputting a horizontal/vertical detail signal, wherein if said controller determines that the horizontal and vertical detail components correspond to the noise component, said horizontal/vertical detail signal is converted into an output signal having a polarity opposite to the polarity of said horizontal/vertical detail signal depending on the amplitude of said horizontal/vertical detail component signal, by said second look-up table, to then be output.

7. A detail enhancement circuit as claimed in claim 6, wherein, if said horizontal/vertical detail signal is determined to correspond to noise and the absolute value of the amplitude of said horizontal/vertical detail signal is less than said predetermined critical point (CP) the magnitude of said look-up table output signal increases exponentially, based on said second look-up table.

8. A detail enhancement circuit as claimed in claim 4, further comprising an adder for adding the horizontal and vertical detail components and outputting a horizontal/vertical detail signal, wherein if said controller determines that the horizontal and vertical detail components correspond to the noise component, said horizontal/vertical detail component signal is converted into a first-order function, depending on the amplitude of said horizontal/vertical detail component signal, by said second look-up table, to then be output.

9. A detail enhancement circuit as claimed in claim 4, wherein said controller comprises:
    an RGB channel correlativity determiner for determining whether the signs of R, G and B signals of the R, G and B channels, respectively, are the same by detecting the signs of signals passing through a spatial filter for said R, G and B channels, to determine a correlativity among the signals of said R, G and B channels;
    an RGB signal level determiner for determining a signal level by comparing the magnitudes of signals passing through a spatial filter for said R, G and B channels; and a control signal output unit for outputting said selection control signal for selecting a corresponding look-up table by performing an OR operation with respect to outputs of said RGB channel correlativity determiner and said RGB signal level determiner.

10. A detail enhancement circuit as claimed in claim 9, wherein said RGB channel correlativity determiner comprises:

an AND gate for performing an AND operation with respect to the horizontal and vertical detail components for said R, G and B channels;

a NOR gate for performing a NOR operation with respect to the horizontal and vertical detail components for said R, G and B channels; and an OR gate for performing an OR operation with respect to outputs of said AND gate and NOR gate.

11. A detail enhancement circuit as claimed in claim 9, wherein said RGB signal level determiner comprises:

first through third inverters for inverting the horizontal and vertical detail components for said R, G and B channels, respectively; and an OR gate for performing an OR operation with respect to outputs of said first through third inverters.

12. A detail enhancement circuit as claimed in claim 4, wherein said delay of a predetermined amount corresponds to a delay of one horizontal line.

* * * * *